UNITED STATES PATENT OFFICE.

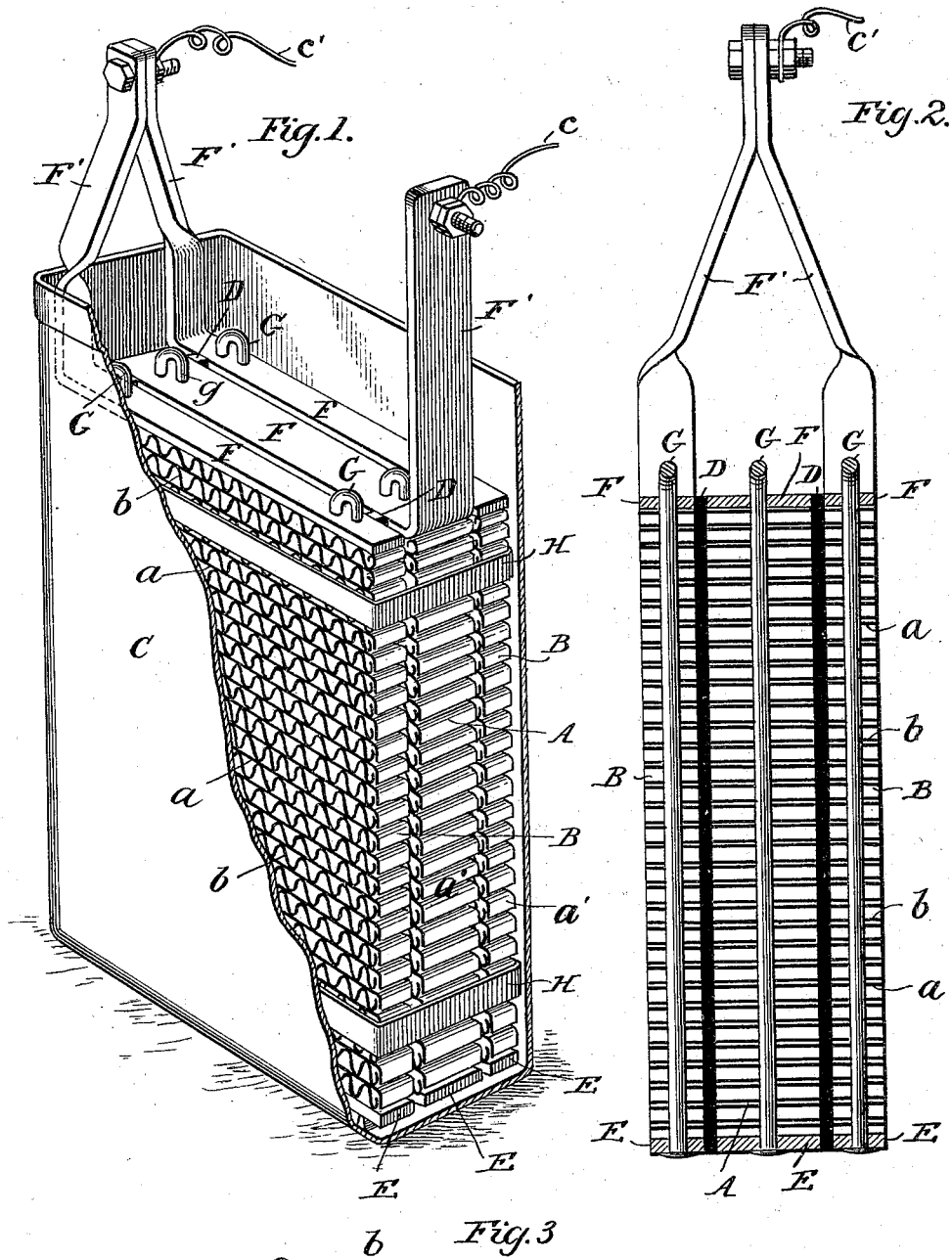

IZAK SAMUELS, OF NEW YORK, N. Y.

SECONDARY-BATTERY PLATE.

SPECIFICATION forming part of Letters Patent No. 556,027, dated March 10, 1896.

Application filed September 10, 1894. Serial No. 522,660. (No model.)

*To all whom it may concern:*

Be it known that I, IZAK SAMUELS, a citizen of the United States, residing in the city, county, and State of New York, have invented certain new and useful Improvements in Secondary-Battery Plates, of which the following is a specification.

My invention relates to what are ordinarily termed "secondary" or "storage" batteries, and more particularly to what are generally known in the art as batteries of the "Planté" type, and it has for its object to provide a simple, cheap and effective battery; and my invention consists in the various features, substantially as hereinafter more particularly pointed out.

Referring to the accompanying drawings, Figure 1 is a perspective view, partly in section, showing an embodiment of my invention. Fig. 2 is a vertical transverse section of Fig. 1 on the line 2 2, the cell or case being omitted; and Fig. 3 is a perspective view of the thin strips or ribbons.

It is not deemed necessary to explain herein what is ordinarily understood as a secondary or storage battery of the Planté type, as the distinguishing characteristics of this class or type of batteries are well known to those skilled in the art; nor is it necessary to recite in whole or in part the many and various improvements and modifications which have been made in the construction and arrangement of the various elements of such a battery, with the object of improving the same.

Experience has demonstrated that certain qualities or characteristics of such a battery are necessary in order to produce a practical and commercial structure, and among these may be mentioned the following: It is desirable to provide the largest possible surface per pound of material of the element exposed to the circulation of the electrolyte in order to get the least weight in the electrodes for the efficiency of the battery. It is also desirable to have the elements occupy the least possible space in proportion to the ampère capacity of the battery. It should be capable of being charged or "formed" at a high rate or with the use of a current of relatively great strength without detriment, and be capable of delivering the current at a high rate for a useful purpose. It should have a low internal resistance, and for this and other purposes it should be constructed without soldering or the interpolation of foreign or extraneous matter, and the parts of the elements should present as nearly perfect contact as possible. Further, it is exceedingly important to provide elements which will not buckle in continued use, which is liable to produce short-circuits and otherwise derange the operation of the cell. Furthermore, it should be cheap of construction and maintenance and of great durability, and the more perfectly a battery possesses these qualities and fulfills these requirements the more valuable and practicable it becomes, and it is with the object of producing a battery which will answer to any and all of these requirements that my present invention is made, and I will now proceed to describe the preferred embodiment thereof, as illustrated in the accompanying drawings.

As above indicated, I have found that to best meet many of the above requirements it is essential that all the elements and parts of the electrodes and connections should be of the same material, without the interpolation of solder or frames or grids of different material, as all these foreign elements have a disturbing effect, as they are liable to produce local action, causing variations in the conductivity of the parts and affecting the mean low internal resistance of the battery, and all these features sooner or later work the destruction of some parts of the battery in charging and discharging under high currents or otherwise, and accordingly I form the electrodes and their connections and every part thereof of one single material, such as lead, or, preferably, an alloy or composition of lead.

The battery in its simplest form comprises two electrodes A and B, which are arranged to be immersed in a suitable electrolyte inclosed in a suitable cell or receptacle C, and, of course, when it is desired to extend the battery the electrodes are duplicated to the desired extent.

The electrode A is the "positive" electrode, so called, and the electrode B is the negative, and I arrange the electrodes so that they will each contain an equivalent amount of metal and divide the negative electrode into two portions, each containing one-half the amount of metal and each arranged on one side of the positive electrode, so that the positive electrode is interposed between the two equal portions of the negative electrode, as in this way I find that not only are the surfaces more exposed and in better position to be formed and to support the active material, but that the internal resistance of the battery is lowered and it can be more quickly and readily formed and discharged under a more uniform and high potential. The positive electrode is separated from the two portions of the negative electrode by any suitable means, as strips D D of non-conducting and inert material.

Each electrode comprises a number of strips of thin metal, a portion of which strips are preferably straight, as $a$, and another portion are corrugated or bent, as $b$, and these are arranged alternately in a pile, as indicated, and the ends of the straight strips may be bent, as shown at $a'$, although this is not necessary. This pile of alternate straight and corrugated strips of metal insures a good and substantial contact between the strips and furnishes a surface well adapted to be exposed to the electrolyte, so that in the "forming" process of the battery the largest proportion of the metal may be evenly subjected to the action and be converted into active material, and the strips or ribbons may be of relatively very thin metal, so that the greatest amount of surface per pound of the electrode is provided. This pile of strips is preferably provided with a somewhat thicker strip E at the bottom and another, F, at the top, and this latter is preferably bent and expanded, as at F', to form a terminal of the element to which the conductors $c\ c'$ are connected, and in the negative element both plates F are expanded and brought together, being held in good electric contact by the binding-screw confining the conductor or otherwise.

In order to hold the strips or ribbons of the electrode together for convenience of handling and insuring good contact, I provide rods or bars G G, which pass through openings in the strips E and F, and the thin ribbons or strips $a\ b$ of the element, and these rods are conveniently headed or otherwise secured in the lower strips and their free ends are bent over the upper strips, as at $g$, so that its end bears upon the upper face of the strip. This allows the rods or bars to yield more or less in case of any expansion of the ribbons or strips in the process of formation and use.

All parts of the electrodes are made of the same material—that is, the ribbons or strips $a\ b$, the heavier strips E F, and the rods G are all made of lead or alloy or composition of lead—and there is absolutely no extraneous or foreign matter in the electrode, and by this construction I avoid all the objections to the use of such materials as solder, or otherwise, which would have a disturbing effect.

The two elements—that is, the two equal portions—of the negative electrode and the interposed positive electrode may be confined for convenience of handling, or otherwise, by elastic or other bands H, if desired, although this is not a necessary feature of my invention.

From this construction it will be seen that I provide a secondary battery which is exceedingly simple in construction and arrangement, and in which there is absolutely no material which is not capable of being formed or rendered active, so that there is the least possible weight for the efficient working surfaces. Moreover, there is the largest relative area of surface exposed to the action of the electrolyte, and, consequently, the largest efficiency. There is no danger of buckling or bending of the electrodes, which would interfere with the operation of the battery, and by arranging the two equal portions of the negative element on opposite sides of the positive element and having the two elements of equal weight I provide a perfectly-balanced battery, and, as above indicated, reduce the internal resistance to a minimum, providing a high delivery rate of current, as well as a quickly and easily forming cell under currents of relatively great strength, and, at the same time, the parts of each element are in good electric contact, offering little or no resistance, and the whole comprises an exceedingly simple, cheap and effective battery.

What I claim is—

1. In a secondary battery, a positive element, and a negative element, each having an equivalent amount of material, the negative element being in two equal portions and arranged on opposite sides of the positive element, substantially as described.

2. A secondary-battery element, comprising a series of alternate plain and corrugated thin strips or ribbons, thicker ribbons at the ends, and rods passing through openings in the ribbons and having their free ends bent to allow for expansion, all the parts of the element being of the same material.

3. A secondary battery, comprising a positive electrode and a negative electrode each having an equivalent amount of material and the negative element being in two equal parts arranged on opposite sides of the positive electrode, each electrode being composed of alternate plain and corrugated strips and having heavier strips at top and bottom, the top strips forming terminals, and the strips being secured by rods of the same material, substantially as described.

In testimony whereof I have signed my name to this specification in the presence of two subscribing witnesses.

IZAK SAMUELS.

Witnesses:
F. L. FREEMAN,
W. CLARENCE DUVALL.